United States Patent [19]

McCurdy

[11] Patent Number: 4,858,594
[45] Date of Patent: Aug. 22, 1989

[54] SOLAR HEATING PANEL WITH CURVILINEAR PASSAGEWAY

[75] Inventor: Ronald E. McCurdy, Rexdale, Canada

[73] Assignee: K-S-H Canada Inc., Mississauga, Canada

[21] Appl. No.: 172,767

[22] Filed: Mar. 28, 1988

[51] Int. Cl.$^4$ .............................................. F24J 3/02
[52] U.S. Cl. ..................................... 126/444; 126/448
[58] Field of Search ............... 126/444, 445, 446, 448; 165/170, 141, 179

[56] References Cited

U.S. PATENT DOCUMENTS

| | | | |
|---|---|---|---|
| 3,119,446 | 1/1964 | Weiss | 165/179 |
| 3,215,134 | 11/1965 | Thomason | 126/444 |
| 4,010,733 | 3/1977 | Moore . | |
| 4,094,300 | 6/1978 | Young . | |
| 4,151,830 | 5/1979 | Crombie et al. . | |
| 4,228,770 | 10/1980 | Davison et al. . | |
| 4,243,020 | 1/1981 | Mier | 126/444 |
| 4,256,087 | 3/1981 | Sowens . | |
| 4,284,065 | 8/1981 | Brill-Edwards . | |
| 4,313,421 | 2/1982 | Trihey . | |
| 4,346,695 | 8/1982 | Kitzmiller | 126/444 |
| 4,471,759 | 9/1984 | Anderson et al. . | |
| 4,476,855 | 10/1984 | Benefield . | |
| 4,503,840 | 3/1985 | Chertok . | |

FOREIGN PATENT DOCUMENTS

| | | | |
|---|---|---|---|
| 1069006 | 1/1980 | Canada | 126/446 |
| 2608302 | 9/1987 | Fed. Rep. of Germany . | |
| 1018804 | 1/1953 | France | 165/179 |
| 2439369 | 5/1980 | France . | |
| 2569259 | 10/1984 | France . | |
| 0624753 | 8/1981 | Switzerland | 126/446 |

Primary Examiner—James C Yeung
Assistant Examiner—Carl D. Price
Attorney, Agent, or Firm—Riches, McKenzie & Herbert

[57] ABSTRACT

A solar heating panel having a curvilinear flow passageway through which a fluid flows to be heated by solar energy, comprising a top sheet having a plurality of upwardly protruding convex upper-portions shaped to reflect a portion of incident energy from the sun to adjacent upper-portions, and a bottom sheet sealingly engaging the top sheet and having a like plurality of upwardly protruding convex lower-portions which underlie a corresponding one of the upper-portions, and protrude upwardly into such upper-portions of the top sheet thereby defining a hollow space therebetween which has a crescent-shaped cross-section, wherein the hollow spaces thereby formed are interconnected to form the flow channel. As a further refinement, undulations, protuberances or depressions may be further provided along the length of the flow channel to introduce turbulence in the fluid flow to thereby increase the rate of heat exchange between the solar heating panel and the fluid.

8 Claims, 3 Drawing Sheets

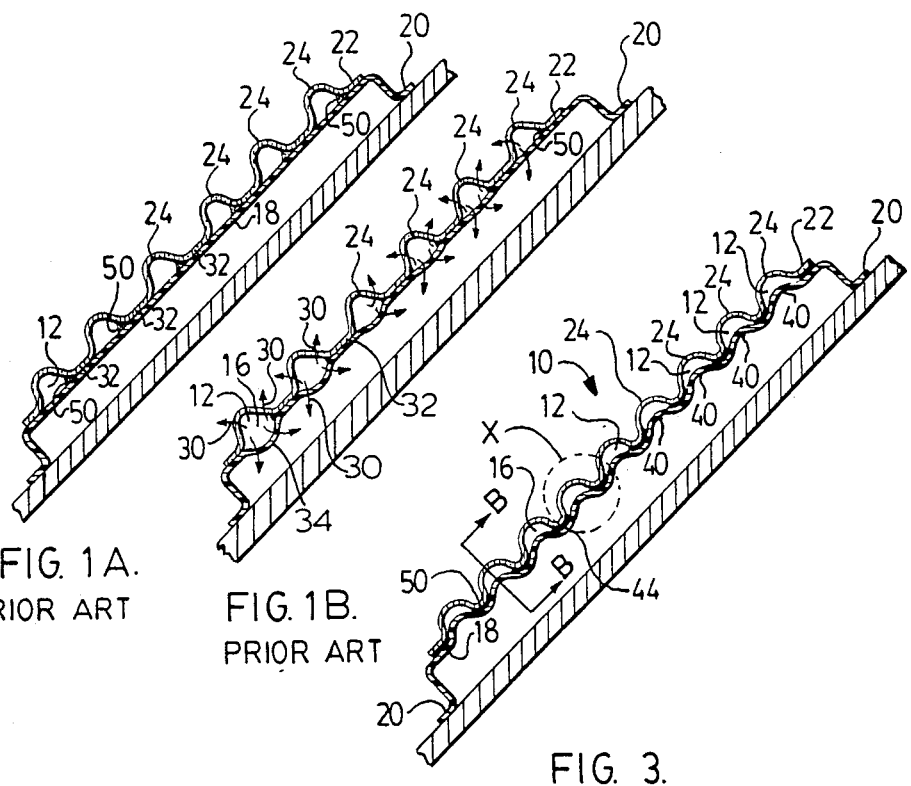
FIG. 1A. PRIOR ART
FIG. 1B. PRIOR ART
FIG. 3.
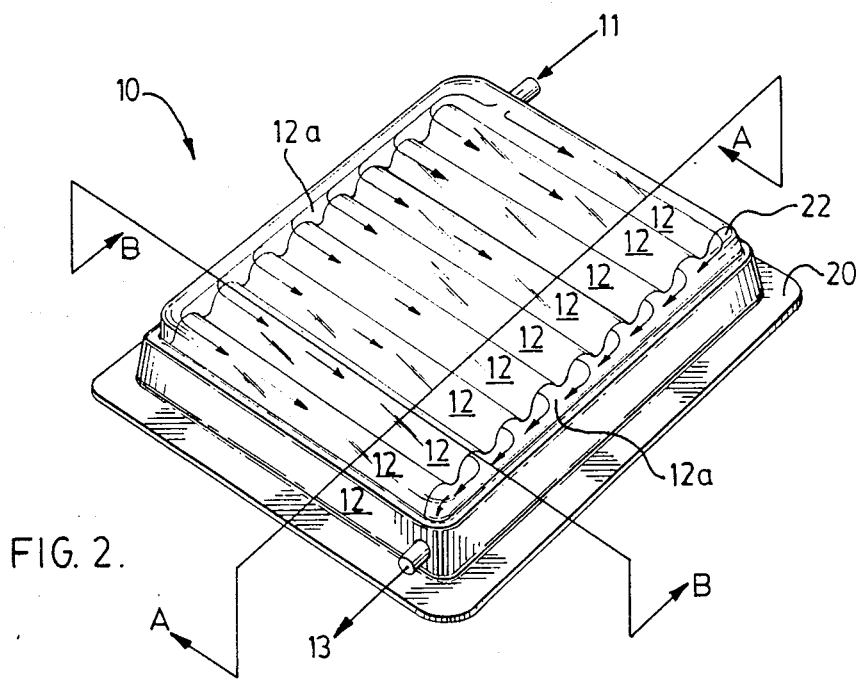
FIG. 2.

FIG. 7.
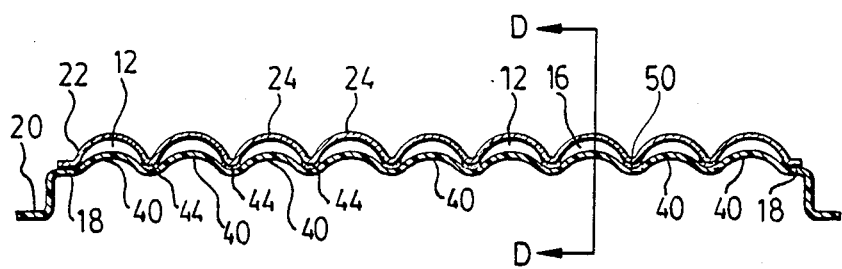
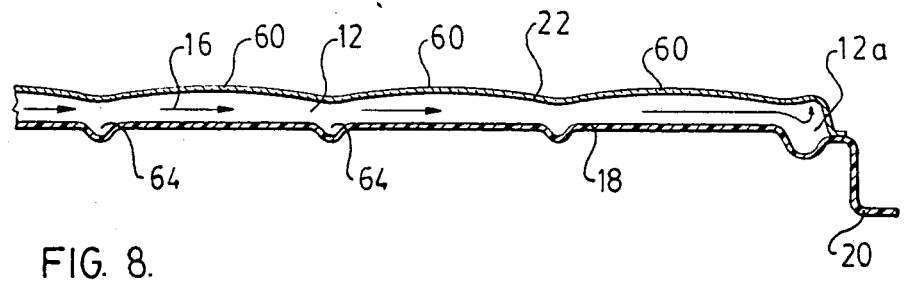
FIG. 8.
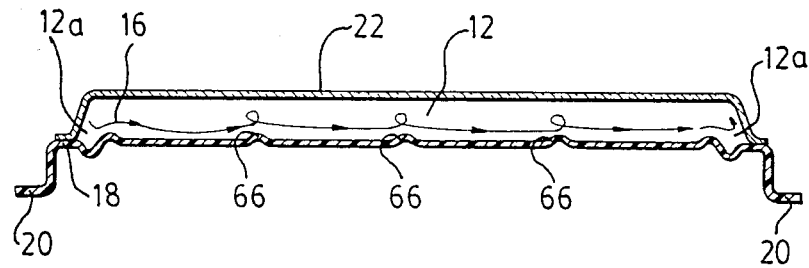
FIG. 9.

SOLAR HEATING PANEL WITH CURVILINEAR PASSAGEWAY

INTRODUCTION

The present invention relates to a solar heating panel through which fluid flows to be heated by solar energy, and more particularly, to a solar heating panel having top and bottom sheets which matingly fit together to form curvilinear flow passages therebetween and which are specially configured to improve sealable contact between such top and bottom sheets along glue lines which separate the flow passages and join the top and bottom sheets of the solar panel together.

BACKGROUND OF THE INVENTION

The present invention is an improvement on the solar heating panel described in an earlier Canadian patent, Pat. No. 1,069,006, which issued Jan. 1, 1980.

Such patent teaches a solar heating panel comprising a top transparent sheet, the transparent sheet having a plurality of mutually adjacent parallel raised semi-tubular portions shaped to reflect a portion of the incident energy from the sun to adjacent portions, the transparent sheet overlying and being affixed to a dark opaque sheet to thereby form hollow areas intermediate each of the semi-tubular portions on the top transparent sheet, through which a heat-absorbing medium may flow.

In the prior art solar panels described above, the top transparent sheet intermediate the upwardly protruding or raised semi-tubular portions thereon contacts the opaque bottom member, and glue, adhesive or hot-melt sealant is used at such contact points or "glue lines" to affix the top transparent sheet to a flat bottom opaque sheet, and effectively sealingly partition one flow channel from the other.

This method is commonly used in other prior art devices, particularly where top and bottom sheets of a polytetrafluorethylene plastic or PVC material are used, as may be seen from U.S. Pat. Nos. 4,151,830 to Crombie et al; 4,476,855 to Benfield; 4,471,759 to Andersen et al and French Pat. No. 2,569,259 to Stref.

In order to effectively sealingly affix the top sheet to the bottom sheet during construction of the solar panel, it is necessary that the glue, when first applied in its unhardened state, or the melted material arising from a heat sealing process, remain along the glue line for a sufficient length of time to allow hardening of the glue or heated material, to thereby bond the top sheet to the bottom sheet. Frequently, in the prior art designs, because of the action of gravity and the particular configuration of the two sheets to be joined, the glue or melted material in its unhardened state would flow away from the glue line, which accordingly resulted in an ineffective sealing engagement along the glue lines due to absence of adhesive or melted product at certain locations. Accordingly, the concave depressions intermediate each of the raised convex portions on the bottom sheet member of the present invention act as glue receptacles to retain the glue in the desired position, and thereby overcome the above problem of prior art designs.

A further problem encountered with prior art designs was evident when applying the glue or adhesive to the bottom sheet member or top sheet member. A worker who was operating a glue dispensing device had to manually guide the glue-dispensing tip of the glue dispenser in a straight line along either the top or bottom member to apply the glue to such members. Frequently, this was difficult to accomplish and any inexperience of the worker resulted in "wavy" glue lines, and thus poor sealing between the top and bottom sheet members. With a configuration of the present invention, wherein the bottom sheet member has a plurality of depressions intermediate each of the raised convex portions thereon, these depressions which receive the adhesive further act as a guide for the glue dispensing tip of the glue dispensing device. Accordingly, a worker assembling the top sheet member to the bottom sheet member need only roughly guide the glue dispensing device along each of the depressions. The glue is then linearly dispensed along the glue line, and the mating half of the top sheet member, when the top and bottom sheet are placed in mutual overlying relation, is automatically positioned along the glue line, and a proper seal is obtained.

A still further problem encountered with the prior art configurations, particularly where a heat sealing method was used, was that the configuration of the top sheet member and the bottom sheet member did not permit self-alignment when the top sheet and bottom sheet members were brought into abutting contact. Accordingly, misalignment of the top and bottom sheet members sometimes occurred, resulting in ineffectual sealing engagement of the two members.

Also, to achieve the desired qualities in the top and bottom sheets of low weight and low cost, the top sheet member and bottom sheet member are normally comprised of a substantially rigid plastic material. Accordingly, such materials were susceptible to bending under certain conditions. A further problem then arose with the prior art configurations in that the bottom sheet members of the solar panels were not shaped to resist bending caused by fluid pressure within the flow channels. Thus, the working medium fluid pressure within the flow channels would frequently cause the bottom sheet member to bulge slightly under such pressure, particularly where a thin, flat thermoformed plastic material was used for the bottom sheet member. This bulging condition induced cracks in the glue line joining the top sheet to the bottom sheet, since the bulging of the bottom sheet caused the bottom sheet to pull away from the top sheet along the glue line by attacking glue adhesive peel strength. Accordingly, a serious problem of earlier panels was that separation of the bottom sheet member from the top sheet member along a single glue line was frequently sufficient to cause immediate domino-like separation of the bottom sheet from the top sheet along remaining glue lines. Consequently, rupture of the panel occurred when the remaining glue lines were then unable to withstand the increased separation force thereon.

Also, even if the remaining glue lines were of sufficient strength to maintain the top and bottom sheet members adhered to one another, where one or more glue lines ineffectively sealed one flow passage from another, undesirable mixing of fluid between adjacent flow passages resulted. This resulted in loss of thermal efficiency, and also, at times, leakage of the working medium from the solar panel itself. Frequently, when such solar panels were positioned vertically, the hydrostatic pressure of the working medium itself, particularly if water was the working medium employed, was sufficient in itself without any added pump pressure to cause bending of the bottom sheet to such a degree that the bottom sheet member was pulled away from the glue line.

Thus a real need existed for a solar panel having working medium flow passages that were of a configuration that allowed easy and more solid gluing along the glue lines. A need further existed for flow passages having a configuration capable of withstanding greater pressures to reduce or eliminate bending of the bottom sheet which resulted in the bottom sheet pulling away from the top sheet member with the consequential loss of sealing engagement along the glue lines.

SUMMARY OF THE INVENTION

In order to overcome the above disadvantages inherent in prior art designs, the present invention relates to a solar panel having a special configuration for the top sheet member and the bottom sheet member which:

(1) allows the two sheet members to be self-aligning when bonded together along glue lines to ensure proper contact and bonding along the glue line;

(2) allows the glue dispensing tip of a glue dispensing device to be linearly guided when dispensing the glue on the bottom sheet member;

(3) provides a glue retaining area intermediate each of the flow channels to ensure that glue, adhesive or hot-melt does not escape during the bonding process of the top sheet to the bottom sheet; and (4) provides a flow channel configuration which allows both the top sheet and bottom sheet to more easily resist deformation under hydrostatic pressure loads from a working fluid within the solar panel, thereby decreasing the tendency of the bottom sheet member and the top sheet member to pull away from each other along the glue lines and cease to remain in sealing engagement.

Accordingly, the present invention relates to a solar heating panel having a transparent top sheet with a plurality of upwardly protruding corrugations, adapted to overlie and be fixedly adhered to an opaque bottom sheet member, the improvement comprising providing the bottom sheet member with a like plurality of upwardly protruding corrugations wherein each corrugation on the bottom sheet member protrudes into a corresponding corrugation on the top sheet member in a manner so as to form a crescent-shaped curvilinear cross-sectional area between the two corrugations, the top sheet member being affixed by adhesive, glue or heat fusion along glue lines intermediate each of the protruding corrugations thereon to the bottom sheet member.

The corrugations on each of the top and bottom sheets are of a raised, uniformly convex shape in cross-section and, accordingly, the crescent-shaped cross-sectional area thereby formed intermediate each of the overlying corrugations, which defines the flow channel, is thereby especially resistant to deformation from hydrostatic pressure exerted within the flow channel, much more so than if one of either the top or bottom sheet had a flat surface rather than the raised, uniformly convex surface. Accordingly, pressure forces within the flow channel are directed on the upwardly protruding convex upper-portions and convex lower-portions of each of the top and bottom sheets respectively, and any deflection of such components is absorbed through a stretching or compressing of such components, rather than through bending or bulging deformation of such components with the above-described detrimental results.

More generally then, the present invention comprises a solar heating panel having a flow channel through which a fluid flows to be heated by solar energy comprising a dark, opaque bottom sheet, a transparent top sheet, the bottom sheet and top sheet joined together to define the flow channel therebetween; the top sheet shaped to have a plurality of upwardly protruding convex upper-portions, the bottom sheet shaped to have a like plurality of upwardly protruding convex lower-portions; each lower-portion underlying a corresponding one of the upper-portions and protruding upwardly therein to define a hollow space therebetween having a crescent shape in cross-section, said hollow spaces being interconnected and defining said flow channel.

In a further refinement, to properly form a glue or adhesive retaining area on the bottom sheet member, and thereby improve bonding of the bottom sheet to the top sheet, recessed portions in which glue or adhesive may be placed or assimilated are provided on the bottom sheet intermediate the upwardly protruding convex lower-portions thereon. Accordingly, the top sheet, when joined to the bottom sheet, contacts the recessed portions intermediate the upwardly protruding convex upper-portions on the top sheet and becomes bonded thereto.

In a preferred embodiment of the present invention, the upwardly protruding convex upper-portions on the top sheet and the upwardly protruding convex lower-portions on the bottom sheet each have the shape of substantially semi-tubular channels, each parallel to one another.

In a still further refinement of the invention described herein, it is common knowledge in fluid mechanics that turbulent flow of a fluid medium, as opposed to laminar flow of such medium, greatly increases the heat transfer between the fluid medium and the surroundings. Accordingly, it is contemplated in such further refinement that one or both of the top sheet and bottom sheet be provided with a series of undulations along the length of semi-tubular channels thereon. These undulations then provide the hollow area formed between the overlying convex upper-portions and lower-portions with alternating increasing and decreasing cross-sectional area. Such increasing and decreasing cross-sectional area along each flow channel induces turbulent flow, rather than laminar flow, of the fluid flowing with the solar panel, thereby increasing the amount of heat absorbed by the fluid from the solar heating panel.

More particularly, in a particular embodiment of that described above, it is contemplated each of the semi-tubular channels protruding upwardly from the top sheet have along their length a plurality of longitudinally spaced-apart convex, bubble-like, raised portions which also provide the hollow area with alternating increasing and decreasing cross-sectional area along the length of the flow channel, thereby causing mixing and turbulence of the fluid flowing within the solar panel, and increasing the heat absorption by such fluid.

Other configurations have been found equally effective in inducing turbulence in fluid flowing within the flow channels. Accordingly, in an alternative embodiment, each of the semi-tubular channels protruding upwardly from the bottom sheet have along the length thereof a plurality of longitudinally spaced-apart depressions or protuberances. Such depressions or protuberances are adapted to cause, respectively, a localized increase or decrease in the cross-sectional area of the flow channel at each location, thereby inducing turbulence in the fluid which flows through the flow channel.

In order that the bottom sheet be molded to possess the required configuration described above, in the preferred embodiment, it is contemplated the bottom sheet be of a plastic material which may be easily thermoformed to the desired configuration. Other materials may, of course, be used.

BRIEF DESCRIPTION OF THE DRAWINGS

Further objects and advantages will appear from the following detailed description of the invention, taken together with the accompanying drawings in which:

FIG. 1A is a cross-sectional view of flow channels within a solar heating panel of the prior art, when no heat exchanging fluid is contained within the flow channels, FIG. 1B is a cross-sectional view similar to FIG. 1A, showing deformation that occurs on the bottom sheet when heat exchanging fluid is contained within the flow channels of the solar panels of the prior art;

FIG. 2 is a perspective view of one embodiment of the solar heating panel of the present invention;

FIG. 3 is a cross-sectional view of the solar heating panel of the present invention taken along plane A—A of FIG. 2;

FIG. 7 is a cross-sectional view taken along plane C—C of the embodiment shown in FIG. 6;

FIG. 8 is a cross-sectional view taken along plane D—D of FIGS. 6 and 7; and

FIG. 9 is a cross-sectional view of another embodiment of the invention taken along a plane similar to plane D—D of FIGS. 6 and 7.

DETAILED DESCRIPTION OF THE INVENTION

Figure 4:
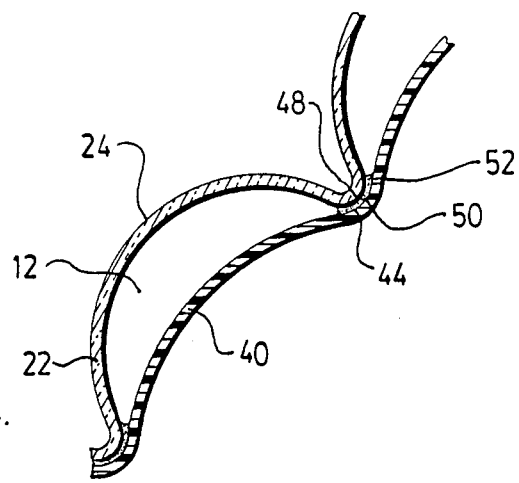
FIG. 4 is an enlarged cross-sectional view of the area designated "X" in FIG. 3.

FIGS. 1 to 9 show a solar heating panel 10 having a flow channel 12 through which a heat exchanging fluid 16 may flow in various flow patterns, to be heated by incident solar energy (see FIG. 2).

Such solar panels generally have a fluid inlet 11 and a fluid outlet 13 which allow, respectively, introduction and removal of the fluid 16 from the solar panel 10.

Solar heating panels 10, in both the present invention and as commonly constructed in the art, generally comprise a bottom sheet 18, a base 20 which may be fixedly attached to the bottom sheet 18 but which is usually integrally molded therewith, and a transparent top sheet 22. FIGS. 1A and 1B show a cross-section through a typical solar heating panel 10 of the prior art, taken along a plane perpendicular to the direction of alignment of the flow channels 12, showing the transparent top sheet 22 fixedly joined to the opaque bottom sheet 18 intermediate upwardly protruding convex upper-portions 24 located thereon. Each of the upwardly protruding convex upper-portions 24 may further be shaped to reflect a portion of the incident energy from the sun to an adjacent upwardly protruding convex upper-portion 24.

In most solar heating panels 10 of the above construction previously known in the art, the transparent top sheet 22 was usually fixedly joined to a flat bottom sheet 18, as shown in FIG. 1A. This configuration had a number of disadvantages. In particular, one disadvantage that was particularly troublesome, especially when lightweight thermoformed plastics were employed for the bottom sheet 18, was the tendency for the bottom sheet 18 to bow or deform outwardly when solar panel 10 was tipped in an upright configuration as shown in FIG. 1B. FIG. 1B shows deformation of the bottom sheet 18 that would occur in each of the lowermost flow channels 12 when the solar heating panel 10 is inclined, as when placed on an inclined roof, for example. This was a result of a greater hydrostatic pressure of the heat exchange fluid in the lowermost flow channels 12 than in the uppermost flow channels 12. This outward bowing of the bottom sheet 18 had the effect of causing the bottom sheet 18 to peel away relative to the top sheet 22 in the direction of arrows 30 shown in FIG. 1B. This further caused separation of the points of attachment of the top sheet 22 to the bottom sheet 18, which was usually along glue lines 32, thereby resulting in ineffective separation of the flow in one flow channel 12 from another and improper regulation of fluid flow patterns within the solar panel, resulting in thermal inefficiency in heating the fluid medium 16.

To partially avoid this problem, as an alternative to greatly increasing the thickness of the bottom sheet 18, prior art devices sometimes resorted to pre-forming the bottom sheet 18 with a plurality of convex, downwardly extending lower-portions 34, which were then overlaid by the top sheet 22 with its convex, upwardly protruding upper-portions 24, to form the flow channels 12. Accordingly, the top sheet 22 was then glued or heat-fused to the bottom sheet 18 intermediate each of the convex, upwardly protruding upper-portions 24 thereon to form the flow channels 12. The shape of such devices was basically that of the deformed panel shown in FIG. 1B.

While the convex lower-portions 34 on the bottom sheet 18 more properly resisted bending due to hydrostatic pressure due to their convex shape, they introduced a further problem. Accordingly, it then became more difficult to properly position the top sheet 22 on the bottom sheet 18 during the gluing or heat-fusing process, since the top sheet 22 lacked any self-aligning means, and had a tendency to slide either laterally to the left or right and became bonded to the bottom sheet 18 at a location other than that which was desired. More critically, however, glue or hot-melt which was used to bond the top sheet 22 to the bottom sheet 18, now had a tendency in its unhardened condition, due to the action of gravity, to flow away from the glue lines 32 and the intended points of contact between the top sheet 22 and the bottom sheet 18, resulting in ineffectual sealing engagement of the top sheet 22 to the bottom sheet 18 at the glue lines 32 (see FIG. 1B).

In the present invention, the special configuration of the top and bottom sheets 22 and 18, respectively, of the solar panel 10, represents a novel configuration which overcomes the above problems associated with the prior art configurations.

Figure 6:
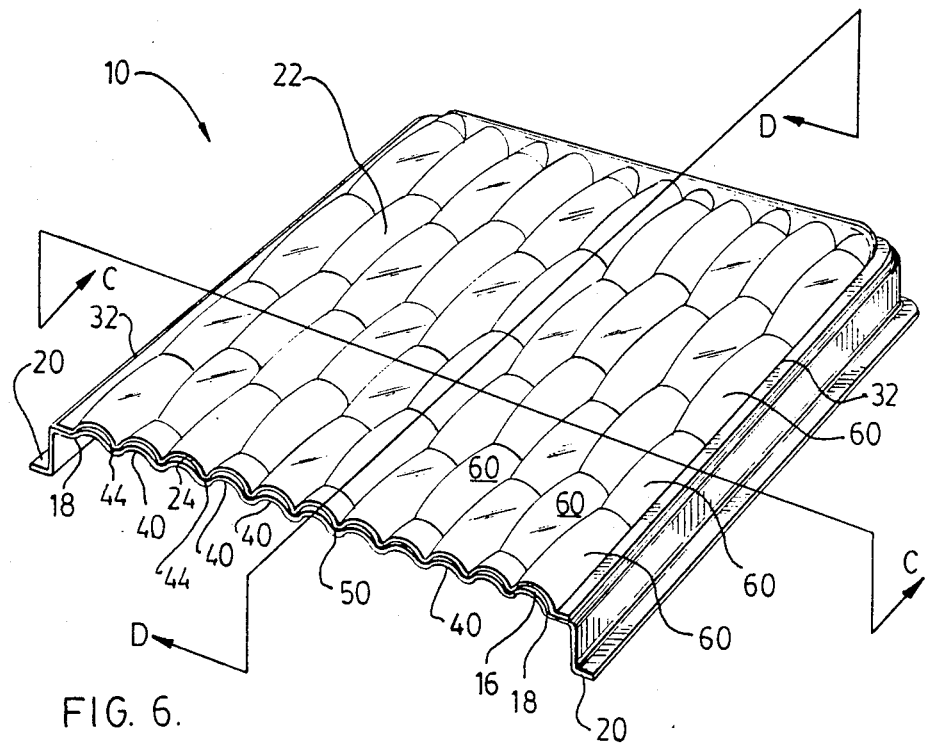
FIG. 6 is a perspective view of a further embodiment of the solar heating panel of the present invention.

More particularly, the present invention, shown clearly in cross-section in FIGS. 3, 4 and 6, further provides the bottom sheet 18 with a plurality of upwardly protruding convex lower-portions 40, each lower-portion 40 adapted to underlie a corresponding one of the upwardly protruding convex upper-portions 24 on the top sheet 22, and protrude upwardly therein to define a hollow space or flow channel 12 which is crescent-shaped in cross-section.

Accordingly, by virtue of such bottom sheet 18 incorporating upwardly protruding convex lower-portions 40, a number of advantages are immediately realized.

Firstly, the convex shape of the lower-portion 40, which protrudes into the upper-portion 24, is more capable of resisting bending or deformation due to hydrostatic pressure forces on such uniformly convex surface by the fluid medium 16 within the solar panel 10, much more so than if the bottom sheet 18 was flat as shown in FIG. 1A. Consequently, the glue joint or glue lines 32 which join the bottom sheet 18 to the top sheet 22 are less subjected to a peeling separating force, but rather only to a tensile separating force, which they are much more capable of withstanding. Thus, bonding strength of the glue joints 32 is greatly improved with this configuration.

Secondly, as may be seen clearly from FIG. 4, by providing a plurality of upwardly protruding convex lower-portions 40, a recessed portion 44 is automatically formed intermediate each of the upwardly protruding lower-portions 40. This recessed portion 44, during manufacture of the solar panel 10, acts as a receptacle for glue, adhesive or hot-melt and serves to retain such bonding matter in such location until it may properly harden when contacted by contact-points on the top sheet 22, intermediate the upwardly protruding convex upper-portions 24 thereon, to fixedly join the top sheet 22 to the bottom sheet 18.

Thirdly, by providing for a plurality of upwardly protruding convex lower-portions 40 on the bottom sheet 18, which individually protrude into the upwardly protruding convex upper-portions on the top sheet 22, the top sheet is automatically aligned in the proper position for bonding onto the bottom sheet 18, and relative slippage between the two sheets, as easily occurs in the prior art (FIG. 1B), is thereby eliminated.

In a preferred embodiment, as shown in FIG. 4, to increase the bonding and sealing engagement along the glue lines 32, the top sheet 22 in such preferred embodiment possesses downwardly protruding concave upper-portions 48 intermediate the upwardly protruding convex upper-portions thereon. The bottom sheet further has concave downwardly protruding lower-portions 52 of similar curvature, so that each of the downwardly protruding concave upper-portions 48 on the top sheet 22, and each of the concave lower-portions 52 on the bottom sheet, respectively overlie and may be fixedly adhered to one another by means of a glue, adhesive or hot-melt 50.

Finally, a still further advantage of the present invention is that the convex lower-portions 40, which protrude into the convex upper-portions 24 on the top sheet, effectively reduce the cross-sectional volume of the crescent-shaped flow passages 12 (see FIG. 4), while at the same time maintain the same exposed area of the flow channel 12 to the incident energy of the sun. This then allows a greater temperature rise in the fluid (usually water) to occur since a smaller volume of water receives the same amount of incident energy. This result may particularly be desired in solar heating applications where it is necessary that the fluid be first warmed to a minimum temperature before being used.

Figure 5:
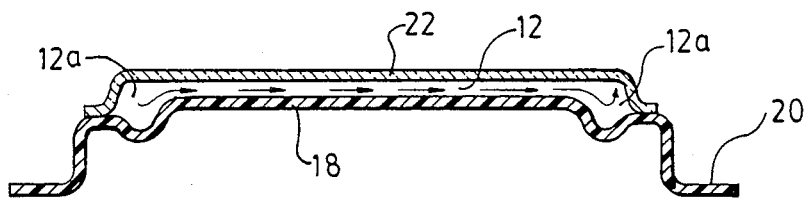
FIG. 5 is a cross-sectional view of the solar heating panel of the present invention taken along plane B—B of FIGS. 2 and 3.

As shown in FIG. 2, it is contemplated in the preferred embodiment that the upwardly protruding convex upper-portions on the top sheet 22, and the upwardly protruding convex lower-portions 40 on the bottom sheet 18 each have the shape of semi-tubular flow channels which are interconnected to form the flow channel 12. FIG. 5 shows a cross-sectional of such a semi-tubular flow channel 12 and FIG. 2 shows a plurality of such flow channels arranged parallel and mutually adjacent to one another, each connected at either end to a manifold 12a of increased volume for supply and removal of the fluid medium 16 within the solar panel 10. Other shapes of flow channel 12 may also be used, such as raised hemispherical domes (not shown), which when interconnected may form the flow channel 12.

As a further refinement to the solar panel 10 of the present invention, it is realized that turbulent flow of the fluid medium 16 within the solar heating panel 10 increases the rate of heat transfer between the solar heating panel 10 and the fluid medium 16 flowing within the flow passages 12.

Accordingly, in a further embodiment of the invention, FIGS. 6, 7 and 8 and, in particular, the cross-section shown in FIG. 8, each show a solar heating panel 10 of the present invention, wherein the top sheet 22 is further modified so as to have along the length of each of the semi-tubular flow channels 12 thereon a series of undulations or bubble-like projections 60. These undulations 60 provide the crescent-shaped cross-sectional area of the flow channel 12 with varying cross-sectional area along the length of the flow channel, thereby alternately increasing and decreasing the flow of the working fluid 16 through the semi-tubular flow channel 12 and inducing turbulence in such flow.

In a still further refinement, a series of longitudinally spaced depressions 64, or longitudinally spaced-apart protuberances 66, may be located along the length of one or more of the semi-tubular channels 12 protruding upwardly from the bottom sheet 18 of the solar panel, as shown respectively in FIGS. 8 and 9.

These depressions 64, or protuberances 66, may be used in lieu of, or in conjunction with, the longitudinal undulations 60, 62 appearing on the top or bottom sheet respectively, to achieve the same purpose of locally decreasing the cross-sectional area of the crescent-shaped area which comprises the flow channel 12 at certain areas along the length of the channel 12 to thereby induce turbulence in the flow of the working fluid 16 flowing through such channels 16, and thereby increase the rate of heat exchange between the solar panel 10 and the fluid 16.

As may be seen from FIG. 7, it is clear that each of the upwardly protruding convex upper-portions 24 on the top sheet 22 maintain in cross-section their convex shape, even though undulations may appear along the length of the semi-tubular channels 12 on the top sheet 22.

To further introduce turbulence in the fluid 16 flowing along the length of the semi-tubular channels, the bottom sheet 18 may alternatively or, in addition to, the undulations provided on the top sheet 22, be modified to have a series of undulations 62 thereon (not shown). Such undulations 62, similar to the undulations 60 appearing on the top sheet 22, provide the crescent-shaped hollow area 12 which comprises the cross-sectional area of the flow channel with alternating increasing and decreasing cross-sectional area along the length of the flow channels 12. To maintain the advantages of the present invention, at all locations along the length of the semi-tubular channels, the upwardly protruding convex lower-portions 40 retain their convex cross-sectional configurations as shown in FIG. 7.

Although the disclosure describes and illustrates preferred embodiments of the invention, it is to be understood that the invention is not limited to these particular embodiments. Many variations and modifications will now occur to those skilled in the art. For definition of the invention, reference is made to the appended claims.

The embodiments of the invention in which an exclusive property or privilege is claimed are defined as follows:

1. A solar heating panel having a flow channel through which a fluid flows to be heated by solar energy comprising:

a dark opaque bottom sheet, a transparent top sheet overlying the bottom sheet, sealing glue means between the top sheet and bottom sheet sealably securing the top sheet and bottom sheet together, each of the top sheet and the bottom sheet formed to have a regular corrugated configuration with alternating upwardly-protruding, upwardly convex portions and downwardly-protruding upwardly concave portions, the convex and concave portions of the top sheet having curvatures of a lesser radii than curvatures of the convex and concave portions of the bottom sheet, the sealing glue means comprising elongate glue strip means centered longitudinally within the concave portions of the bottom sheet, each concave portion of the top sheet centered above and nested within a corresponding concave portion of the bottom sheet secured and sealed centrally therein by one of said glue strip means, each convex portion of the top sheet centered above and overlying a corresponding convex portion of the bottom sheet defining therebetween a hollow space of an upwardly convex crescent shape, said hollow spaces interconnected and defining said flow channel.

2. A solar heating panel as claimed in claim 1, wherein each of said top sheet and bottom sheet have said corrugated configurations substantially along the entire length of each sheet whereby said hollow spaces comprise a plurality of parallel hollow spaces.

3. A solar heating panel as claimed in claim 2 wherein the convex portions of the bottom sheet include a plurality of longitudinally spaced upwardly extending protuberances, each extending transversely substantially across the width of the convex portions.

4. A solar heating panel as claimed in claim 3 wherein said bottom sheet is comprised of a thermoformed plastic.

5. A solar heating panel as claimed in claim 2 wherein said bottom sheet is comprised of a thermoformed plastic.

6. A solar heating panel as claimed in claim 2 wherein the bottom sheet includes a plurality of longitudinally spaced downwardly extending depressions, each extending transversely substantially across the width of the convex portions.

7. A solar heating panel as claimed in claim 6 wherein said bottom sheet is comprised of a thermoformed plastic.

8. A solar heating panel as claimed in claim 1 wherein said bottom sheet is comprised of a thermoformed plastic.

* * * * *